United States Patent [19]

Bach et al.

[11] 4,356,998
[45] Nov. 2, 1982

[54] SELF-CLOSING TAP VALVE

[76] Inventors: Eugen Bach, Durlacher Strasse 34, 7531 Keltern-Ellmendingen; Jürgen A. Bach, Forlenweg, 7531 Keltern-Niebelsbach, both of Fed. Rep. of Germany

[21] Appl. No.: 168,632

[22] Filed: Jul. 11, 1980

[51] Int. Cl.³ .................. F16K 31/00; F16L 27/04
[52] U.S. Cl. .................... 251/354; 251/DIG. 1; 285/261; 119/75
[58] Field of Search .............. 222/505, 531, 537; 251/349, 354, 82; 137/616, 616.3, 616.5; 119/72.5, 75; 285/261

[56] References Cited

U.S. PATENT DOCUMENTS

| | | | |
|---|---|---|---|
| 656,759 | 8/1900 | Wirt | 137/313 |
| 1,748,817 | 2/1930 | Zerk | 285/261 |
| 2,417,494 | 3/1947 | Hoof | 251/DIG. 1 |
| 2,522,258 | 9/1950 | Fanshier | 251/354 |
| 2,971,761 | 2/1961 | Shames et al. | 285/261 X |
| 3,060,965 | 10/1962 | Taggart | 251/354 X |
| 3,276,796 | 10/1966 | Daniel | 285/261 |
| 3,536,092 | 10/1970 | Klasson | 137/329.02 |
| 3,931,992 | 1/1976 | Coel | 285/30 |

Primary Examiner—A. Michael Chambers
Attorney, Agent, or Firm—Joseph A. Geiger

[57] ABSTRACT

A self-closing tap valve with a tiltable outlet member which is supported in a valve housing by means of a ball-and-socket-type support and which, when forcibly tilted, lifts a pressure-biased valve plate off an upstream-facing valve seat in the housing. The valve plate incorporates a radially or axially protruding gasket, clamped or vulcanized in place, or the valve seat is part of a resilient seat ring insert. Resilient sealing and shock-dampening members cooperate with the tiltable outlet member.

21 Claims, 6 Drawing Figures

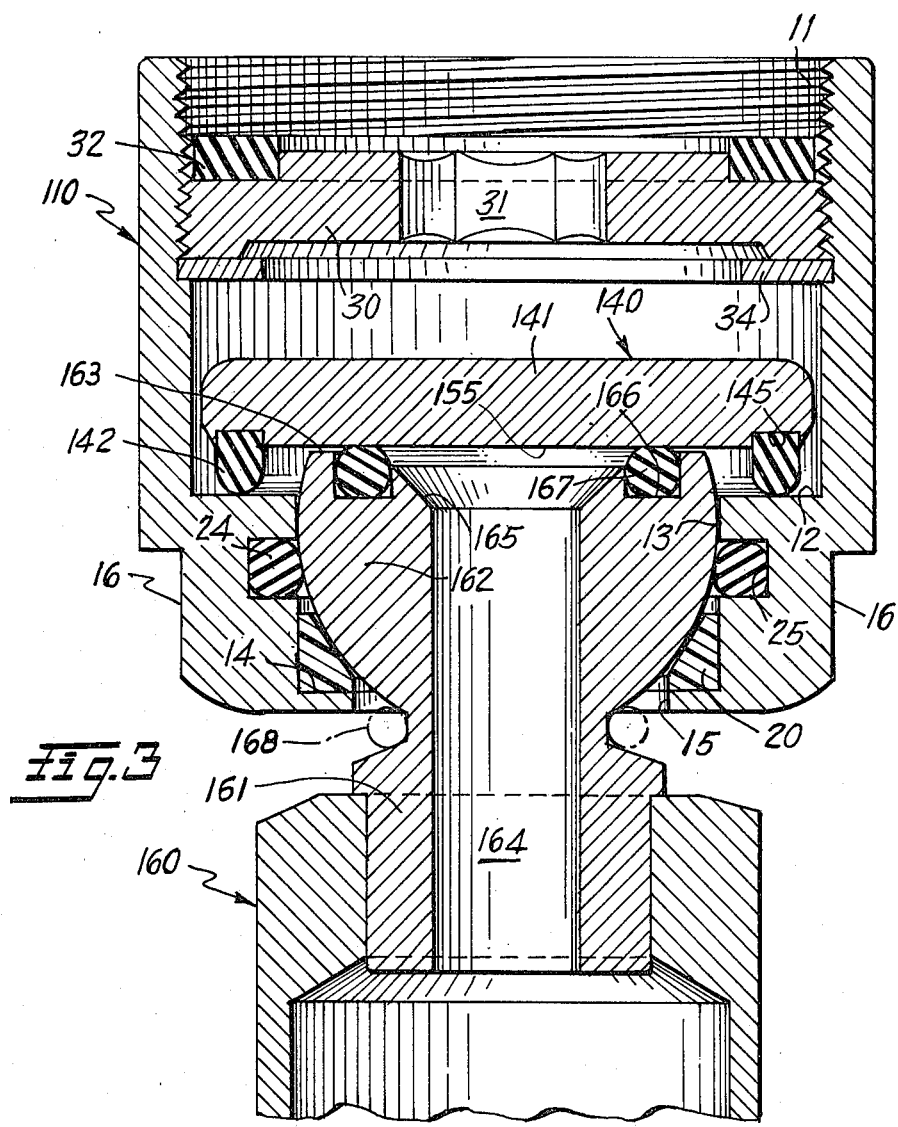
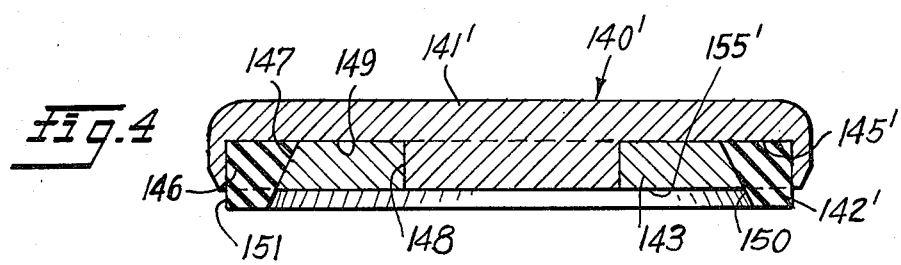

SELF-CLOSING TAP VALVE

BACKGROUND OF THE INVENTION

1. Field of the Invention

The present invention relates to shutoff valves serving to control the flow of a pressurized fluid, and, more particularly, to a self-closing tap valve which is openable by tilting an outlet member.

2. Description of the Prior Art

A self-closing valve of the type under consideration is a shutoff valve which is used as a dispensing device in connection with a supply of pressurized fluid, most frequently water, and in some cases compressed air. The valve opens under the application of an outside force to a tiltable outlet member which, in turn, moves a valve control member by overcoming a permanent valve-closing bias on the valve control member. The valve-closing bias may be built into the valve mechanism, derived from a spring or from gravity, for example, or it may be resulting from the action of the pressurized fluid. In each case, the valve closes automatically, as soon as the outside force is no longer present.

Self-closing valves of this type are particularly advantageous in situations where the deliberate closing of a dispensing valve by the user cannot be counted on. This is generally the case with all animals. Many animals, for example, can learn to open a dispensing valve, if the action required is as simple as applying pressure to an easily accessible control member in response to a feeding urge, but one cannot expect that these animals will also learn to perform a valve-closing action, after they cease drinking.

There also exist various circumstances under which the use of a manually actuatable self-closing tap valve is advantageous in connection with water dispensing systems. This is particularly the case in public facilities and in highly frequented semi-public or private facilities, where user negligence can lead to considerable waste. This kind of waste may be very costly in the case of a hot water dispensing system.

Among the reasons why self-closing tap valves are not being found more frequently in everyday use, are their inadequate operational longevity, due to gasket water and spring corrosion, for example, and/or the lack of operational convenience, especially of those self-closing tap valves which have to be opened by depressing a push button.

The prior art in the field of tiltable self-closing valves includes U.S. Pat. No. 656,759 which suggests a hose valve with a vertically oriented outlet pipe. The latter is tiltable in any direction about the center of a spherical head on the extremity of the outlet pipe, thereby forcibly lowering a guided valve tappet from a downwardly oriented valve seat, in opposition to a compression spring.

U.S. Pat. No. 749,285 discloses a tap valve with a horizontally extending outlet pipe which, when pivoted downwardly, lifts a vertically guided valve plunger from a valve seat. The plunger is biased against the seat by its weight and by a diaphragm under fluid pressure which engages its upper extremity.

Both of these tap valves are complex in structure and therefore costly and susceptible to wear and leakage and/or breakdowns.

U.S. Pat. No. 3,756,199 concerns itself with a tiny "nipple valve" of the self-closing type with a tiltable outlet member, the valve being proposed for an automatic poultry watering installation. The head of the tiltable outlet member lifts a closure disc off an upstream-facing valve seat, in opposition to the weight of a vertical plunger.

Automatic laboratory animal watering devices are disclosed in British Pat. No. 1,195,655, and German Offenlegungsschrift (Publ. Appln.) No. 1,550,478, and a cattle watering device is suggested in German Offenlegungsschrift No. 2,306,380.

The automatic animal watering devices which are suggested in these patents are unsuitable for other than their specialized use, because they are either too small, as in the case of the nipple valve, or too rudimentary, as in the case of the cattle watering valve.

SUMMARY OF THE INVENTION

Underlying the present invention is the primary objective of devising an improved self-closing tap valve which, while being mass-producible at low cost, is adapted for general use and especially as an automatic water tap, with or without a conventional manually closable shutoff tap.

The present invention proposes to attain this objective by suggesting a self-closing dispensing valve which has an upstream-facing valve seat arranged in a valve housing, a freely movable valve plate cooperating with the valve seat to close the outlet port under fluid pressure, and a tiltable outlet pipe which lifts the valve plate from the valve seat to open the valve. The outlet pipe has an axial outlet bore and an enlarged head portion in the shape of a truncated sphere by which it is pivotably supported in the valve housing.

A preferred embodiment of the invention features a disc-shaped valve plate with an attached sealing ring which protrudes axially over the contact face of the valve plate. This sealing ring is attached to the valve plate by means of a vulcanization bond. Alternatively, the sealing ring may be in the form of an O-ring which is compressed and retained between opposing clamping flanks of an annular groove. One clamping flank may be part of a separate gasket clamping ring which is removably or permanently attached to the valve plate.

In another embodiment of the invention, the valve plate cooperates with a resilient seat ring which is fixedly mounted in the valve housing, either in a press fit in a housing bore or clamped against an interior shoulder of the bore by means of an abutment member which is threaded into the housing bore. An intermediate spacer ring with axial grooves on its inner diameter may simultaneously serve as a guide for the valve plate.

The spherical head portion of the tiltable outlet pipe is guided in a bore portion of the valve housing and pivotably supported by a socket ring near the downstream end of the housing bore. A neck formation behind the spherical head portion may carry a resilient ring to cushion the abutment action between the tilting outlet pipe and the valve housing.

An additional O-ring in an axial groove on the truncated extremity of the spherical head portion of the outlet pipe may be used to increase the frictional resistance between the valve plate and the tilting outlet pipe, thereby slowing down the closing movement of the valve plate, in order to dampen any closing shocks.

BRIEF DESCRIPTION OF THE DRAWINGS

Further special features and advantages of the invention will become apparent from the description following below, when taken together with the accompanying drawings which illustrate, by way of example, several embodiments of the invention which are represented in the various figures as follows:

FIG. 3 is a longitudinal cross section of a different self-closing tap valve, representing a second embodiment of the invention;

FIG. 4 shows a modified version of a valve plate which is usable in the embodiment of FIG. 3, for example;

DESCRIPTION OF THE PREFERRED EMBODIMENTS

The present invention lends itself to a number of different embodiments and modifications. The drawings illustrate three such embodiments, differing from each other primarily with respect to the configuration of the valve seat and the cooperating valve plate.

Figure 1:
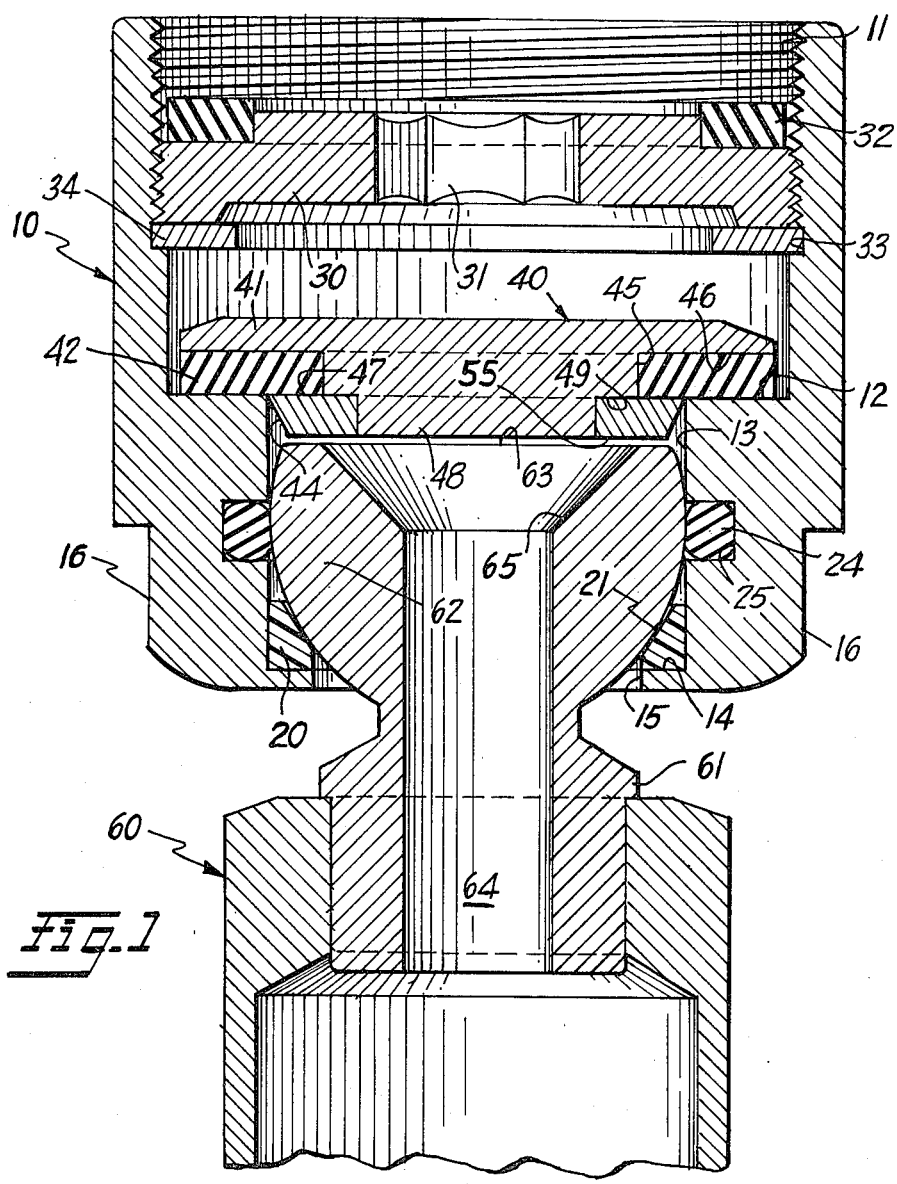
FIG. 1 is a longitudinal cross section of a self-closing tap valve, representing a first embodiment of the invention, the valve being shown in the closed position.
Figure 2:
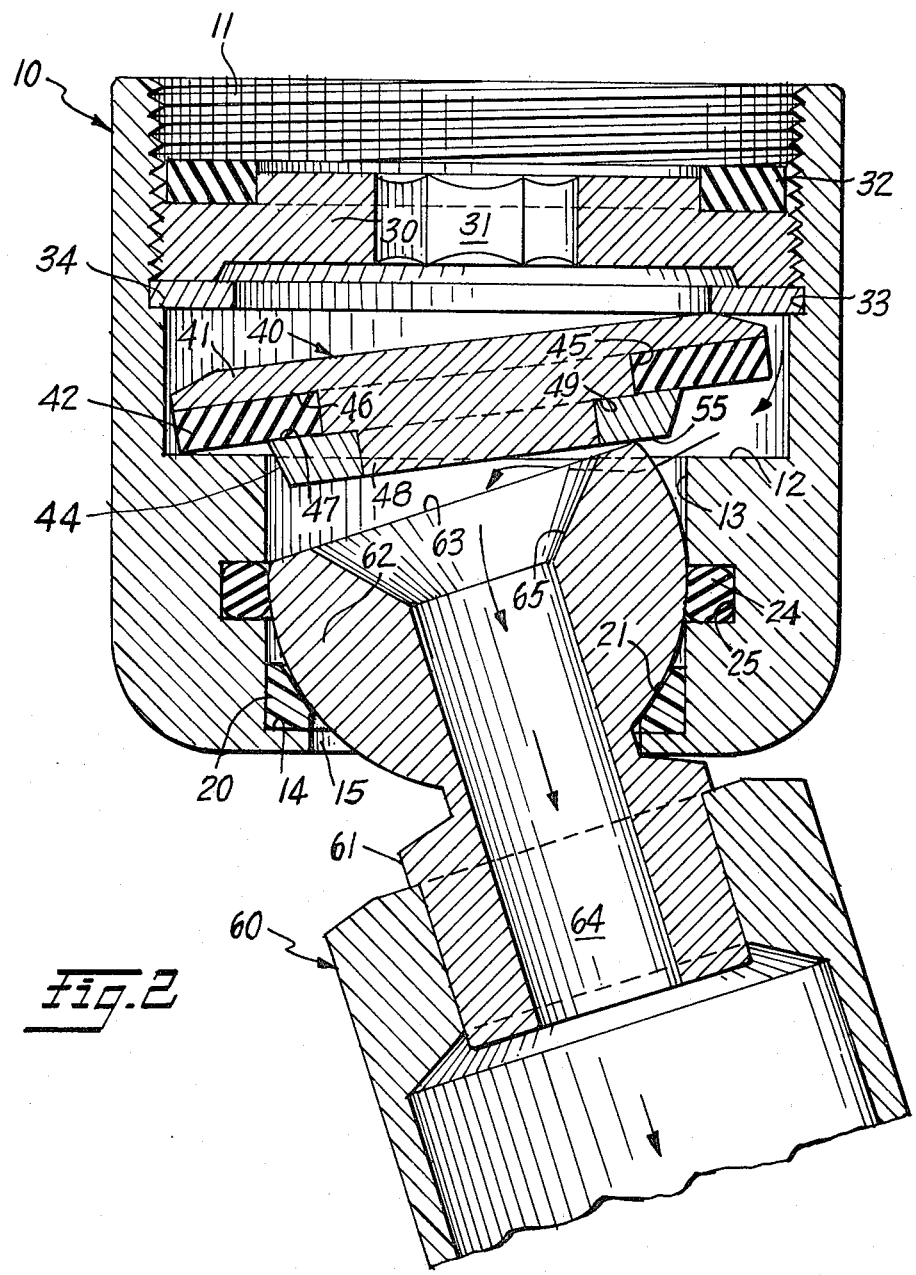
FIG. 2 shows the tap valve of FIG. 1 in an open position.

The tap valve of FIGS. 1 and 2 consists of three basic parts: a valve housing 10, an outlet member or outlet pipe 50, and a valve closing member or valve plate 40. For purposes of easier description, it will hereinafter be assumed that the orientation of the main axis of the valve is vertical, the valve inlet being on the upper side of the valve housing 10, and the valve outlet on the lower extremity of the outlet pipe 20. It follows that the fluid will flow axially downwardly through the valve. This assumed orientation of the valve, though preferred for many applications, is not a prerequisite for a satisfactory operation of the valve.

The valve housing 10 is a body of rotation whose longitudinal axis is also the main axis of the valve assembly. The interior space of the housing is determined by a bore formation which extends axially through the valve housing 10, taking the form of a threaded first bore portion 11 of large diameter in the upper half of the housing, a downwardly continuing second bore portion or guide bore portion 13 of smaller diameter, and an intermediate first interior shoulder or valve seat 12. At the bottom end of the bore formation follows a very short third bore portion 15 of still smaller diameter forming a second interior shoulder 14.

Screwed into the threaded bore portion 11 is a cover disc 30 with a hexagonal central opening 31 which serves both as a tool opening for an allen wrench and as a flow channel for the fluid. A snap ring 34 which is seated in a groove 33 of the valve housing 10 provides an axial clamping abutment for the cover disc 30. Against a shoulder on the upper side of the cover disc 30 is seated a gasket 32 which provides a thread seal, when the valve housing is attached to a suitable fluid outlet, such as the threaded extremity of a pipe, or the threaded spout of a shut-off valve, for example. The valve housing shown in FIG. 1 is particularly adapted for connection to the threaded spout of a conventional water faucet. For this purpose, the valve housing 10 has tool facets 16, or a suitably knurled surface, on its outer diameter.

Once connected to a source of pressurized fluid, the interior of the valve housing 10 becomes part of a pressure space which is delimited in the downstream direction by the upstream-facing valve seat 12 and a valve plate 40. The latter bears against the valve seat 12, under the influence of the pressurized fluid. An annular gasket 42 of rectangular cross section provides the sealing contact between the valve seat 12 and the valve plate 40.

The gasket 42, of rubber or some other resiliently compressible material, is seated in a radially open groove 45 of the valve plate 40 and firmly clamped between upper and lower radial clamping flanks 46 and 47 of the groove 45. The lower clamping flank 47 is a face of a separate clamping ring 43. This ring is seated on a short cylindrical extension 48 of the valve plate body 41, positioned by a shoulder 49. Thus clamped, the gasket 42 cannot be removed from its seat in the groove 45 by the action of the pressurized fluid, when the valve plate executes opening and closing movements.

In the closed position of the valve, which is shown in FIG. 1, the clamping ring 43 of the valve plate 40 is surrounded by the guide bore portion 13 of the valve housing 10. A taper 44 on the outer diameter of the clamping ring 43 produces a centering action for the valve plate 40, as it approaches the valve seat 12.

FIG. 2 shows the valve of FIG. 1 in an open position. The opening and closing movements of the valve plate 40 are the result of a pivoting action of the outlet pipe 60. For this purpose, the valve housing 10 and the outlet pipe 60 form a ball-and-socket connection by means of which the head 61 of the outlet pipe is guided and axially supported in a universal joint. The ball part of the connection is an enlarged spherical portion 65 of the head 61 which has a truncated upper extremity forming an annular face 63 around the central outlet bore 64 of the outlet pipe 60. An entry taper 65 facilitates the flow of fluid from the open valve seat 12 of FIG. 2 into the bore 64 of the outlet pipe 60.

The socket part of the ball-and-socket connection is formed in part by the guide bore portion 13 of the valve housing 10 and in part by a socket ring 20. The latter is seated in the bottom corner of the guide bore portion 13, supported by the second interior shoulder 14. While the guide bore portion 13 serves to center the spherical head portion 62 of the outlet pipe 60, the socket ring 20 supports it in the axial sense, engaging its surface with a supporting taper 21 whose cross-sectional outlet forms a tangent line to the circular outline of the spherical head portion 62. The material of the socket ring is preferably a dry-bearing plastic, such as polytetrafluoroethylene, or the like.

In the guide bore portion 13 is further arranged a radial groove 25 which accommodates an O-ring in engagement with the surface of the spherical head portion 62. This O-ring seal prevents the leakage of fluid around the outside of the outlet pipe 60 in the open valve position (FIG. 2). It also dampens the opening and closing action of the valve by producing a friction effect on the tilting outlet pipe 60.

In the drawing, only the upper portion of the outlet pipe 60 is shown. It should be readily apparent that the lower part of the outlet pipe may have any of a number of shapes, in adaptation to the particular application of the tap valve of the invention. For example, the outlet pipe may be a short length of tubing, carrying on its outlet extremity an air mixing head of the type which is found on water taps. In this case, the outlet pipe can be tilted to an open position by means of a finger or other portion of a hand, or by pushing against it with the inside wall of a receptacle, for example. Alternatively, the downstream extremity of the outlet pipe 60 may be connected to a flexible hose which, when pulled away from the tap valve, causes the outlet pipe to tilt, thereby opening the valve.

FIG. 2 shows that, when the outlet pipe 60 is tilted away from its axial alignment position, its annular face 63 assumes an inclined orientation in which its highest point pushes upwardly against the bottom face 55 of the valve plate 40, thereby lifting it from the valve seat 12. This opening action requires a plate lifting force which is in excess of the closing pressure which is exerted by the pressure space on the upstream side of the valve plate 40.

The opening movement of the valve plate 40 is a pivoting movement about a point on its gasket 42 which remains in contact with the valve seat 12. The open valve plate 40 permits fluid to flow around the plate periphery and radially inwardly into the entry taper 65 of the outlet bore 64, as indicated by the flow arrows in FIG. 2.

The throttling effect of the fluid flow path through the open valve and the lack of counterpressure from the outlet bore 64 produce a pressure differential on the valve plate 40 which results in a continuous downstream-oriented closing bias on the latter. This means that the valve plate 40 presses downwardly against its contact point with the annular face 63, thereby producing a tilting moment on the outlet pipe 60 which, if no longer opposed by the valve opening force, will return the outlet pipe 60 to its axially aligned position and allow the valve plate 40 to return to its closed position in contact with the valve seat 12.

The fact that the closing bias on the valve plate 40 is not produced by gravity signifies that the valve of the invention is self-closing in any mounting orientation. It should be understood, however, that gravity may be used to provide a contributory or offsetting action, if the outlet pipe 60 is made long and/or heavy and oriented so that its center of gravity is laterally offset from its pivot center in the spherical head portion 62.

A second embodiment of the invention is shown in FIG. 3. This tap valve resembles the valve of FIGS. 1 and 2 in most parts, but differs from it with respect to the configuration of its two moving parts, viz. the valve plate and the spherical head portion of the outlet pipe. To the extent that other parts and features of this embodiment are identical with parts and features of the earlier-described embodiment, they carry the same reference numerals and their description in connection with this embodiment is dispensed with.

The valve plate 140 of the second embodiment (FIG. 3), unlike the valve plate 40 of the first embodiment (FIG. 1), has a shallow axially open groove 145 on its downstream side which positions an annular gasket 142. The latter protrudes axially from the lower face 155 of the valve plate body 141 to cooperate with the upstream-facing valve seat 12. The gasket 142 is permanently attached to the valve plate body 141 by means of a bond. Preferably, the gasket is of rubber and the bond is obtained by vulcanization. Accordingly, the valve plate 140 consists of only two parts of very simple configuration.

The cooperating spherical head portion 162 of the outlet pipe 160 differs from the corresponding head portion of FIG. 1 by including in its annular face 163 an axially open groove 166 which holds an O-ring 167. The latter bears against the face 155 of the valve plate body 141 in the closed valve position and in near-closed positions. The purpose of the O-ring 167 is to produce a shock-dampening action in the final portion of the closing motion by creating a friction effect between the valve plate 140 and the tilting outlet pipe 160, inasmuch as the contact point between the plate-lifting edge of the annular face 163 and face 155 of the valve plate body 141 undergoes a shift in the radial sense, as can readily be seen by comparing its radial position in FIG. 1 with its radial position in FIG. 2. The entry taper 165 of the central outlet bore 164 is of reduced depth, in order to accommodate the axial groove 166 in the annular face 163.

It should be understood that, while the outlet pipe 160 of FIG. 3 differs from the outlet pipe 60 of FIG. 1 with respect to the addition of the friction-inducing O-ring 167, this modification is optional in character, meaning that it is possible to use the outlet pipe 60 of FIG. 1 in the valve assembly of FIG. 3, or to use the modified outlet pipe 160 in the valve assembly of FIGS. 1 and 2.

FIG. 3 also shows a second optional modification of its outlet pipe 160 in the form of a small O-ring 168 which is engaged around the neck portion of its head 161, as is indicated by stippled cross section circles. The O-ring 168 serves as a tilt-limiting and shock absorbing element between the outlet pipe 160 and the valve housing 110, where it is squeezed against the edge of the third bore portion 15. As in the case of the friction-inducing O-ring 167, the shock-absorbing O-ring 168 is not limited to use in connection with the embodiment of FIG. 3, but may be added to any one of the outlet pipes which are shown in the drawing.

Whereas the two-piece valve plate 140 of FIG. 3 requires a permanent bond for the attachment of its gasket 142, such a bond is not necessary, if a three-piece design is used instead in which the gasket is held between opposing clamping flanks. Such a modification is shown in FIG. 4, where the gasket clamping features of the valve plate of FIG. 1 are adapted to the axially protruding gasket of FIG. 3.

This is accomplished by arranging in the valve plate body 141' of the valve plate 140' a large axial recess which forms a short cylindrical extension 148 and a shoulder 149 for the seating of a clamping ring 143. The latter has on its periphery a tapered clamping flank 147 which, in cooperation with the cylindrical outer clamping flank 146 of the body recess, forms a groove 145' for the gasket 142'. This gasket has matching cylindrical and tapered inner and outer surfaces 150 and 151, respectively, thus assuring a permanent clamping connection between it and the valve plate body 141'. It should be noted that the configuration of the groove 145' could also be used to clamp a regular O-ring of round profile or a cut gasket of rectangular profile.

Figure 5:
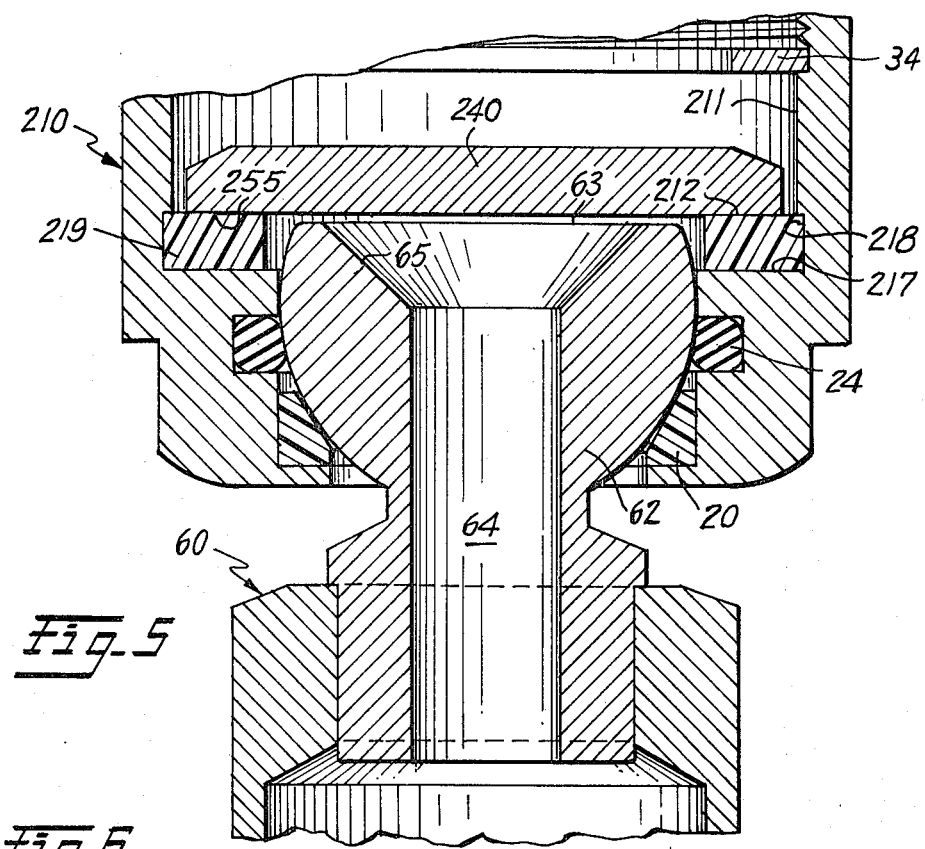
FIG. 5 is a longitudinal cross section of still another tap valve, representing a third embodiment of the invention.

FIG. 5 shows a third embodiment of the invention. Here, the valve seat 212 is no longer an interior shoulder of the valve housing 210, but an upstream-facing surface of a resilient seat ring 219. The latter is retained in its place by a snap-mounting configuration, engaging a shallow radial retaining groove 218 and resting against an intermediate interior shoulder 217 of the valve housing 210. The material of the seat ring 219 is preferably polytetrafluoroethylene or a comparable synthetic material.

By providing resiliency in the valve seat 212, it becomes possible to dispense with a valve plate gasket, so that the valve plate 241 is reduced to a simple flat metal plate whose bottom face 255 serves as a contact surface for both the valve seat 212 and the annular face 63 of the outlet pipe 60. The latter is shown to be unchanged from the embodiment of FIGS. 1 and 2.

Figure 6:
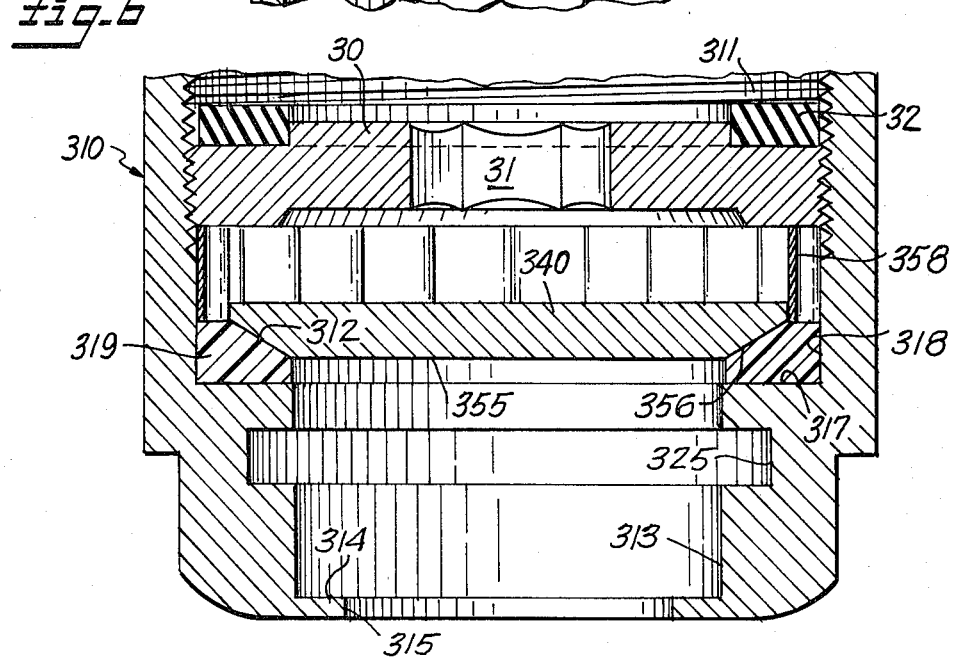
FIG. 6 shows a modification of the embodiment of FIG. 5.

A modified version of the embodiment of FIG. 5 is shown in FIG. 6, where the outlet pipe has been omitted from the drawing. Like the tap valve of FIG. 5, the valve of FIG. 6 has a resilient seat ring 319 and a cooperating simple valve plate 340 which differs from the previously described valve plate by having a seating taper 356 with which it engages a matchingly tapered valve seat 312 of the seat ring 319.

FIG. 6 also shows a way of centering and guiding the valve plate 340, a feature which is advantageous in connection with the tapered valve seat 312. For this purpose, the periphery of the valve plate 340 is enclosed within an undulated spacer ring 358. The latter is preferably a sheet metal stamping, serving at the same time also as an assembly abutment for the cover disc 30. By thus using a spacer ring between the cover disc 30 and the seat ring 319, it is possible to eliminate the snap ring (cf. 34 in FIG. 1) and its groove and to replace the seat ring retaining groove 218 of FIG. 5 with a straight bore portion 318.

The present invention can be advantageously applied to a water dispensing system, in the form of a self-closing water tap, with or without an intermediate conventional water tap on its upstream side. For such an application, it is preferable to utilize corrosion-free materials such as plated brass or stainless steel for all metallic valve components.

It should be understood, of course, that the foregoing disclosure describes only preferred embodiments of the invention and that it is intended to encompass within it all changes and modifications of these examples of the invention which fall within the scope of the appended claims.

We claim the following:

1. A self-closing dispensing valve for pressurized fluids comprising in combination:
    a valve housing enclosing a pressure space with an inlet port and an outlet port, the inlet port being part of a connection to a source of pressurized fluid and the outlet port being surrounded by a valve seat on the upstream side of the outlet port;
    a valve closing member arranged in the pressure space of the housing so as to face the valve seat, the valve closing member cooperating with the valve seat to normally close the outlet port under the effect of the pressurized fluid; and
    an elongated hollow outlet member supported by the valve housing, the outlet member having an axial outlet bore in communication with the outlet port, at least when the valve is open; and wherein
    the valve closing member has a generally plate-shaped outline, being liftable from the valve seat in a tilting motion of random tilt orientation;
    the outlet member has on its upstream extremity an enlarged spherical head portion which cooperates with the valve housing to form a ball-and-socket connection giving universal pivotability to the outlet member;
    the outlet member further has on its upstream end an annular face in the form of a truncation on its spherical head portion arranged to cooperate with a contact face on the downstream side of the valve closing member, so that a randomly oriented pivoting movement of the outlet member away from a normal position in which said two faces are aligned causes the annular face of the outlet member to move against the contact face of the valve closing member, thereby tilting and laterally lifting the latter from the valve seat to open the valve.

2. A valve as defined in claim 1, wherein
    the valve closing member has attached to it a resiliently compressible gasket element which faces towards the valve seat.

3. A valve as defined in claim 2, wherein
    the valve seat is an annular face surrounding the truncated spherical extremity of the outlet member;
    the valve closing member has the shape of a flat disc, its contact face reaching radially beyond the annular face of the outlet member and forming an annular groove near its radial periphery; and
    the gasket member of the valve closing member is a resilient sealing ring which is engaged in the annular groove of the valve closing member in such a way that it protrudes beyond its contact face in the axial direction.

4. A valve as defined in claim 2 or claim 3, wherein
    the valve closing member is a disc of stainless steel; and
    the gasket member is a rubber ring which is permanently attached to the valve closing member by means of a vulcanization bond.

5. A valve as defined in claim 2 or claim 3, wherein
    the annular groove of the valve closing member has opposing clamping flanks which are so arranged that the gasket element is compressed and retained between them and the insertion and removal of the gasket element from the annular groove necessitates the displacement of at least one of the clamping flanks.

6. A valve as defined in claim 5, wherein
    the annular groove of the valve closing member is an axial groove, having a radially inwardly facing outer flank which serves as one of the clamping flanks for the gasket element; and
    the valve closing member has attached to it a gasket clamping ring with a radially outwardly facing flank which serves as the other clamping flank for the gasket element.

7. A valve as defined in claim 5, wherein
    the annular groove of the valve closing member has a radially inwardly facing outer flank which serves as one of the clamping flanks for the gasket element;
    the valve closing member includes a cylindrical shoulder portion which is arranged concentrically inside said outer flank and which carries, fixedly seated thereon, a gasket clamping ring with a radially outwardly facing flank which forms a portion of the annular groove and serves as the other clamping flank for the gasket element; and
    the contact face of the valve closing member is a face on the gasket clamping ring.

8. A valve as defined in claim 2, wherein
    the valve closing member has a radially open annular groove carrying the gasket element; and
    the annular groove has opposing clamping flanks which are so arranged that the gasket element is compressed and retained between them and the insertion and removal of the gasket element from the annular groove necessitates the displacement of at least one of the clamping flanks.

9. A valve as defined in claim 8, wherein
the annular groove of the valve closing member has a substantially radially extending flank which serves as one of the clamping flanks for the gasket element; and
the valve closing member includes a cylindrical shoulder portion arranged on the same axial side as said clamping flank and carrying, fixedly seated thereon, a gasket clamping ring with a likewise substantially radially extending flank which forms a portion of the annular groove and serves as the other clamping flank for the gasket element.

10. A valve as defined in claim 8 or claim 9, wherein
the valve seat in the valve housing is an annular surface of substantially radial orientation; and
the gasket member has an annular cross-sectional outline which is defined by substantially cylindrical inner and outer peripheries and substantially parallel radial flanks of the gasket member.

11. A valve as defined in claim 1, wherein
the valve seat in the valve housing is a surface of an annular seat ring which is fixedly mounted in the valve housing, in a concentric relationship with the outlet port and the tiltable outlet member.

12. A valve as defined in claim 11, wherein
the valve housing has a cylindrical bore defining at least a portion of its pressure space, said bore having a threaded length portion and an interior shoulder against which the annular seat ring is positioned; and
the valve further comprises a matchingly threaded abutment member engaged in said housing bore, the abutment member limiting the distance of opening lift of the valve closing member, while clamping the seat ring of the valve seat against the interior shoulder of the housing bore.

13. A valve as defined in claim 12, wherein
the threaded abutment member includes a separate spacer ring which surrounds the valve closing member and serves to transmit a clamping force from the abutment member to the seat ring.

14. A valve as defined in one of claims 1, 11, 12 or 13, wherein
the valve closing member is a disc-shaped member;
a constituent part of the valve surrounds the valve closing member so as to guide it by its periphery; and
the guide interface between said constituent part and the valve closing member defines at least one axial flow channel for the flow of fluid past the valve closing member, when the latter is lifted off the valve seat.

15. A valve as defined in claim 1, wherein
the valve has a longitudinal axis defined by the axis of a bore which extends through the valve housing, at least a portion of the pressure space being defined by said bore, and the direction of fluid passage through the valve, when open, coinciding with its longitudinal axis;
the housing bore includes a guide bore portion which surrounds the spherical head portion of the outlet member; and
the valve housing further includes a socket ring which is arranged near the downstream extremity of the housing bore in such a way that it serves as an axial support and pivot support for the tiltable outlet member by engaging its spherical head portion on the downstream side of its maximum diameter, at a smaller support diameter.

16. A valve as defined in claim 15, wherein
the housing bore further includes a radial groove; and
the valve housing further includes an O-ring engaged in said radial groove and contacting the spherical head portion of the outlet member so as to serve as a seal between it and the valve housing in all tilt positions of the outlet member.

17. A valve as defined in claim 15, wherein
the socket ring has a taper with a cross-sectional outline which forms a tangent line to the circular outline of the truncated sphere of the outlet member; and
the socket ring is of a non-metallic material which has dry-bearing capabilities in cooperation with a metallic surface on the truncated sphere.

18. A valve as defined in claim 15 or claim 16, wherein
the housing bore has, in the downstream axial sense, adjoining first and second bore portions and an intermediate interior shoulder;
the first bore portion defines a portion of the pressure space, having an internal thread by which it is connectable to a threaded pipe that leads to said source of pressurized fluid;
the intermediate interior shoulder determines the valve seat; and
the second bore portion has a smaller diameter than the first bore portion, serving as said guide bore portion.

19. A valve as defined in claim 18, wherein
the housing bore has at its downstream end a short third bore portion of a diameter which is smaller than the diameter of the second bore portion, forming a second interior shoulder between the two bore portions, the second shoulder serving to axially position and support the socket ring of the valve housing.

20. A valve as defined in claim 15, wherein
the tiltable outlet member has a groove-like neck formation between its body and its spherical head portion; and
the outlet member further includes a resilient abutment ring which is engaged around its neck formation so as to cushion the abutment action between the fully tilted outlet member and the valve housing.

21. A valve as defined in claim 1, wherein
the valve closing member has a generally axially oriented contact face with which it cooperates with the truncated extremity of the spherical outlet member head portion;
the outlet member further includes in said truncated extremity an annular axial recess and a friction ring which is received in said recess in such a way that a portion thereof touches the contact face of the valve closing member in the closed, untilted position of the outlet member and over an initial angle of tilting displacement, thereby creating an increased frictional resistance against the relative radial movement at the contact point between the valve closing member and the outlet member.

* * * * *